April 5, 1966 J. FARMER 3,244,209
FRUIT TREATING MACHINE
Filed May 16, 1960 9 Sheets-Sheet 1

FIG. 1

Inventor:
John Farmer
By Wilmer Mechlin
his Attorney

April 5, 1966  J. FARMER  3,244,209
FRUIT TREATING MACHINE
Filed May 16, 1960  9 Sheets-Sheet 2

Inventor:
John Farmer
By Wilmer Mechlin
his Attorney

April 5, 1966

J. FARMER 3,244,209

FRUIT TREATING MACHINE

Filed May 16, 1960

Inventor:
John Farmer
By Wilmer Mecklin
his Attorney

April 5, 1966  J. FARMER  3,244,209
FRUIT TREATING MACHINE
Filed May 16, 1960  9 Sheets-Sheet 5

Inventor:
John Farmer
By 
his Attorney

FIG. 11

April 5, 1966  J. FARMER  3,244,209
FRUIT TREATING MACHINE
Filed May 16, 1960  9 Sheets-Sheet 8

Inventor:
John Farmer
By Wilmer Mechlin
his Attorney

April 5, 1966 J. FARMER 3,244,209
FRUIT TREATING MACHINE
Filed May 16, 1960 9 Sheets-Sheet 9

Inventor:
John Farmer
By Wilmer Mecklin
his Attorney

# United States Patent Office 3,244,209
Patented Apr. 5, 1966

3,244,209
FRUIT TREATING MACHINE
John Farmer, Kailua, Oahu, Hawaii, assignor to Honolulu Iron Works Company, Honolulu, Hawaii, a corporation of Hawaii
Filed May 16, 1960, Ser. No. 29,508
19 Claims. (Cl. 146—6)

This invention relates generally to machines for treating fruit and more particularly to machines for sizing, trimming and coring pineapples and like fruit.

In preparing a pineapple for canning it is customary initially to subject it in sequence to three operations: one, sizing, in which the side portion of its skin or rind, usually termed the "shell" is removed by a cylindrical knife to leave a cylindrically-sided body of the diameter desired for canning; another, trimming, in which the crown and butt portions or ends of the skin or rind are cut off; and the third, coring in which the fruit cylinder, now devoid of skin, is cored to remove its hard core. For almost forty-five years these operations have been performed by a machine known for its inventor as a "Ginaca" machine. Despite its long use the Ginaca machine has changed little since it was first introduced, the last changes of any real consequence having been incorporated in a model brought out in 1925 and the last of which any sizeable quantity has been manufactured.

Basically, the Ginaca machine has a cylindrical sizing knife, a multi-barrelled turret into which the sized pineapples are directed after passing through an intervening throat, a plurality of knives and a coring tube arranged respectively to make the butt and crown cuts on and core a pineapple as the turret is indexed and a plunger for ejecting the cored fruit cylinders from the turret as the operating cycle is completed on each. In these respects the Ginaca machine is sound. However, in the particular sequence of its operations, the force by which the pineapples are driven through the sizing knife and therefrom into the turret, the number and exposure of the drives for its working parts and the arrangement of its drives and working parts, the Ginaca machine, with all its improvements, leaves much to be desired. Difficult to clean, exposing the fruit to contamination by oil and grease drippings from its exposed drives and insufficient in the force applied to drive the pineapples through the sizing knife into the barrels of the turret, the best Ginaca machine now in use is severely limited in its rate of production and completely unsuited to a rate readily achievable with automation.

The primary object of the present invention is to provide an improved machine for sizing, trimming and coring pineapples and like fruit which not only eliminates the faults of present Ginaca machines as to cleaning and dripping of oil and grease but is capable of a much higher rate of production.

Another object of the invention is to provide an improved machine for treating pineapples, whereby each pineapple is driven independently through the sizing knife to the turret with a force sufficient to insure against sticking en route, even when, to obtain more precise fruit cylinders and correspondingly reduce fruit loss, the clearance on the diameter between the sized pineapples and the transfer passage is reduced from the usual ⅛″ to as little as ¹⁄₆₄″.

An additional object of the invention is to provide an improved feed conveyor for feeding fruit or other objects for cutting or other treatment whereby, without increase in the overall speed of the conveyor, the object is given an additional impetus as it is fed to or through the treating means.

A further object of the invention is to provide an improved machine for treating pineapples wherein the timing of the movements of the turret and its associated treating devices is directly relatable to the rate at which pineapples are fed to the sizing knife.

Another object of the invention is to provide an improved Ginaca machine wherein the sequence of the operations performed after a pineapple has entered the turret in such as to permit a very substantial reduction in the size and weight of the turret, and the length and travel of the coring tube.

A further object of the invention is to provide an improved Ginaca machine wherein the turret is so driven as to afford an adequate interval during indexing for each of the various operations, including a slow advance and quick return of the coring tube, with consequent minimizing of fruit damage.

Another object of the invention is to provide an improved Ginaca machine wherein the drives are enclosed and in the main contained in a central housing between the sizing knife and turret and through which the barrel of the sizing knife projects, whereby the fruit is effectively protected from oil and grease drippings and approximately 60% of the moving parts and attendant structure of previous machines is enabled to be eliminated.

An additional object of the invention is to provide an improved Ginaca machine wherein the precise relationships required between the sizing knife, coring mechanism and turret are all established by mechanism located on the same rigid housing, thereby eliminating the need for frequent checking of those relationships and the interruptions of production required therefor.

Another object of the invention is to provide an improved Ginaca machine wherein cleaning, repair and replacement of certain of the parts associated with the turret is facilitated by mounting those parts as a subassembly removable as such from the remainder of the machine.

Other objects and advantages of the invention will appear hereinafter in the detailed description, be particularly pointed out in the appended claims, and be illustrated in the accompanying drawings, in which:

Referring now in detail to the drawings in which like reference characters designate like parts, the improved fruit treating machine of the present invention, while having features applicable for treating other fruit, is particularly adapted for preparing pineapples for canning, and in the embodiment illustrated as exemplary of the invention, is especially designed for that purpose. Capable in its illustrated embodiment of sizing, trimming and coring pineapples, the basic operations customarily performed by a Ginaca machine, the improved machine, as applied to pineapples, is appropriately termable an improved Ginaca machine and is sometimes so termed herein.

Stationarily mounted on a suitable stand, bedplate or base 1 the illustrated machine is comprised essentially of a central or main housing or frame 2 bolted or otherwise fixedly attached to the stand, a rotary sizing knife 3 rotatably mounted on and projecting forwardly from the main housing 2 and a turret 4 also rotatably mounted on the main housing. As in the most recent version of the conventional Ginaca machine, the 1925 model, the sizing knife 3 is cylindrical, the turret 4 is multibarrelled or pocketed, the rotative axes of the sizing knife and the turret are parallel and inclined downwardly toward the rear or discharge end of the machine, and there are associated with the turret means for trimming the crown and butt ends from and coring a pineapple. Also conventionally the improved machine has a feed conveyor 5 for feeding pineapples from one or more loading stations or points through the sizing knife 3, the preferred conveyor feeding the pineapples along a path which initially is horizontal and in advance of the knife is downwardly inclined in correspondence with the inclination of the knife's axis. Following better practice, the preferred feed conveyor 5, as it drives pineapples downwardly toward the sizing knife, drives them through a primary fruit guide 6 disposed to guide them over the smooth or gradual bend or curve in the path and formed of hoops 7 carrying spring fingers 8 and, immediately in advance of the sizing knife 3, through a centering head 9, such as shown in Fox Patent No. 2,652,915 of Sept. 22, 1953. While thus basically similar to conventional Ginaca machines, the improved machine differs therefrom in many respects, as will become apparent as the description proceeds.

The illustrated feed conveyor 5 has a frame 10 fixed, as by bolting, to and extending forwardly from the stand 1 and having over its upper part transversely spaced, parallel upper side members or sides 11. To simplify structure, the side members 11 preferably follow the desired path of travel of the pineapples to the sizing knife 3 and thus in the main are horizontal but bend or turn downwardly toward the rear with their rear end portions at substantially the same inclination or slope as the axis of the sizing knife. So bent, the side members 11 conveniently mount the primary guide 6 and centering head 9, the former over the area in which they bend downwardly and the latter on their rear end portions. The path of travel of pineapples during feeding actually is controlled by an open-topped, centrally slotted V-shaped trough or guideway 12 into which pineapples are loaded and on which they are fed from the loading station or stations to the centering head 9. Extending from adjacent the front end of the frame 10 to the centering head 9 and including the loading station or stations within its extremities, the trough 12 is bolted or otherwise adjustably mounted on the frame 10 above the side members 11 and may be formed of a plurality of guide rails or rods 13, one or more at each side with the rails at opposed sides adjustable in their transverse spacing to suit the size of pineapple being processed. In accordance with the desired path of travel of the pineapples, the guide rails 13, forwardly of the primary guide 6, are substantially horizontal, bend downwardly as some or all of them pass through the primary guide and, there beyond, are inclined at the inclination of the axis of the sizing knife 3, the rear portions of the rails being so set in position transversely and vertically as, relative to the sizing knife, with the assistance of the primary guide 6, to deliver the pineapples to the centering head 9 substantially centered on the knife.

For feeding, driving or forcing pineapples from the loading station or stations along the guide rails 13 through the primary guide 6 and centering head 9, as well as through the sizing knife 3, there are employed in the preferred feed conveyor 5 a plurality of pushers or pusher fingers 14 carried by and spaced equidistantly along an endless roller chain or like drive or drive member 15. The preferred roller chain 15 runs on a pair of sprockets, rollers or pulleys mounted at opposite ends of the frame 10 in suitable bearings 16, at least one, preferably the rear sprocket 17 being a drive, and the other, the front sprocket 18, an idler. The pushers 14 being designed in their advance flight to project upwardly through the trough 12 into the primary guide 6 and centering head 9 and through their heads 19 maintain engagement with the butt ends of the pineapples until the sizing of each has been completed by the sizing knife 3, it is necessary that the chain 15 conform to that path in its advance flight between the longitudinally and vertically spaced front or upper and rear or lower sprockets 17 and 18. To this end, the driving chain 15, beneath the area or zone 20 in which the path of the pineapples bends downwardly, may run over a third sprocket but preferably rides over a direction-changing, upwardly convex guide plate 21 mounted between the side members 11 and conforms in curvature intermediate its ends to the bend in the pineapples' path.

Following the development mentioned in the Fox patent, supra, pushers or feed conveyors for Ginaca machines can be made capable of following pineapples into the throat of the tubular sizing knife, thus ensuring that a pineapple will be sized completely under the pressure of its pusher. This, according to the Fox patent, is accomplishable by pivotally mounting the pushers on the usual drive chain and providing each pusher with front and rear rollers at each side of its body, which, over the advance flight of the pusher, guide or position the latter by riding in guide slots in opposite sides of the conveyor frame. So guided into the throat of the sizing knife, the pusher can be retracted by a pair of camming rollers mounted on its body above the guide or positioning means, and adapted, as the latter leave the guide slots, to engage cam tracks on the frame and cause the pusher to retract from the throat and swing clear from the knife and associated structure as it passes around the adjoining sprocket toward its return flight.

The pushers 9 of the illustrated feed conveyor 5 are given the same capability in somewhat the same manner. Thus, each pusher 9 has a bifurcated body or carriage 22 pivotally or swingably mounted or connected to the drive chain 15, as by a pivot pin 23 extending transversely through the front part of the body and an embraced pair of lugs 24 upstanding from a companion pair of links 25 of the drive chain. As well, the body 22 of each pusher 14 is provided with rear and front pairs of guide rollers 26 and 26a and a pair of camming rollers 27, ridable, respectively in guide tracks or slots 28 on or in and extending longitudinally of the confronting faces 29 of the side members 11 and in cam tracks or slots 30 on or in the same faces adjacent the rear ends of the side members. However, as opposed to pushers of the Fox patent, the front pair of guide rollers 26a is inset, laterally or transversely of the carriage 22 relative to the rear pair 26 mounted on the tail or rear end portion 31 of the body. This relative insetting of the front guide rollers 26a stems from a feature of the feed conveyor 5 which greatly increases the effectiveness of the pushers 14 in aiding transfer of sized pineapples from the sizing knife 3 into the open-ended barrels or pockets 32 of the turret 4.

The feature responsible for the increased effectiveness of the pushers 14 is the provision of means for temporarily increasing the velocity of the head 19 of each pusher relative to that of the drive chain 15 at the instant the pusher pushes its pineapple through the sizing knife. This involves forming in the rear or trailing end portion 33 of each of the guide tracks 28 a camming slot 34 adapted to project each pusher head 19 forwardly relative to the drive chain 15 by swinging, pivoting, kicking or lifting the tail 31 of its carriage 22 up about its pivot 23 as the head begins to swing about the drive sprocket 17 and disposing the cam slot and the drive sprocket relative to the sizing knife 3 such that their joint action or cooperation in accelerating or increasing the velocity of the head relative to the chain occurs as the pineapple is pushed through the sizing knife. Since, to be effective, the camming slot 34 must act only on the rear pair of guide rollers 26, the rear end portions 33 of the guide tracks 28 are cut or set back outwardly relative to the preceding portions of the tracks so as to continue to contain and guide the rear pair of rollers but free or release the front pair 26a.

Each camming slot 34 may simply be a leg in each guide track 28 bent, curved, sloping or inclined upwardly relative to the preceding portion of the track. Since each pusher head 19, as it approaches the sizing knife 3, must be substantially centered thereon to enable the knife to make a straight rather than a curved cut and the acceleration by the camming slot 34 and the drive sprocket 17 both involve the vertical movement of the head out of centered position across the butt end of the pineapple, it is desirable that the accelerating action be applied as close as possible to the point at which the pineapple is pushed clear of the knife edge 40 and this is accomplishable by the single legged camming slot. However, at slight possible expense to the straightness of the cut due to the extension of the distance in which the camming action occurs, a greater increase in the acceleration derived from that action can be obtained, within the limits of relative vertical movement imposed by the sizing knife 3, by initially swinging the tail 31 of the carriage 22 downwardly, so that the head is first retracted or withdrawn back and then projected forwardly relative to the drive chain 15. It is this latter form that has been incorporated in the illustrated machine, each camming slot 34 being a downwardly bowed or convex reverse or return bend, the front, leading or entrant leg 35 of which is inclined, angled, bent or turned downwardly relative to the preceding portion of its guide track 28 and the following, trailing or head-accelerating leg 36 of which is inclined upwardly or upbent or up-turned relative both to that portion and to the entrant leg. Moving each head 19 above center but without loss of contact with a pineapple, since the latter is then undergoing sizing, the entrant leg 35 enables the accelerating leg 36 to be of greater length, for a given gradient and within the limits on vertical movement of the heads imposed by the sizing knife, than the accelerating leg of a single-legged camming slot, with correspondingly greater acceleration of the heads.

The illustrated camming slots 34 also include rear or exit legs 37 immediately in advance of and opening onto the rear ends 38 of the guide tracks 28. Merging forwardly with the upturned intermediate leg 36, each rear leg 37 is inclined or curved downwardly relative both to that leg and to the portion of the guide track preceding the camming slot. The head 19 of the related pusher 14 having been projected into the throat 39 of the sizing knife 3 during its acceleration relative to the drive chain 15, downwardly bent rear leg 37 serves to slow down and, in effect, initiate the retraction of the head from the knife immediately before the engagement of the camming rollers 27 with the cam slots 30 which controls the actual retraction and swinging of the pusher clear of the knife and associated structure as the pusher disengages a pineapple and continues its turn or swing around the drive sprocket 17 toward its return flight.

Figures 4, 5:
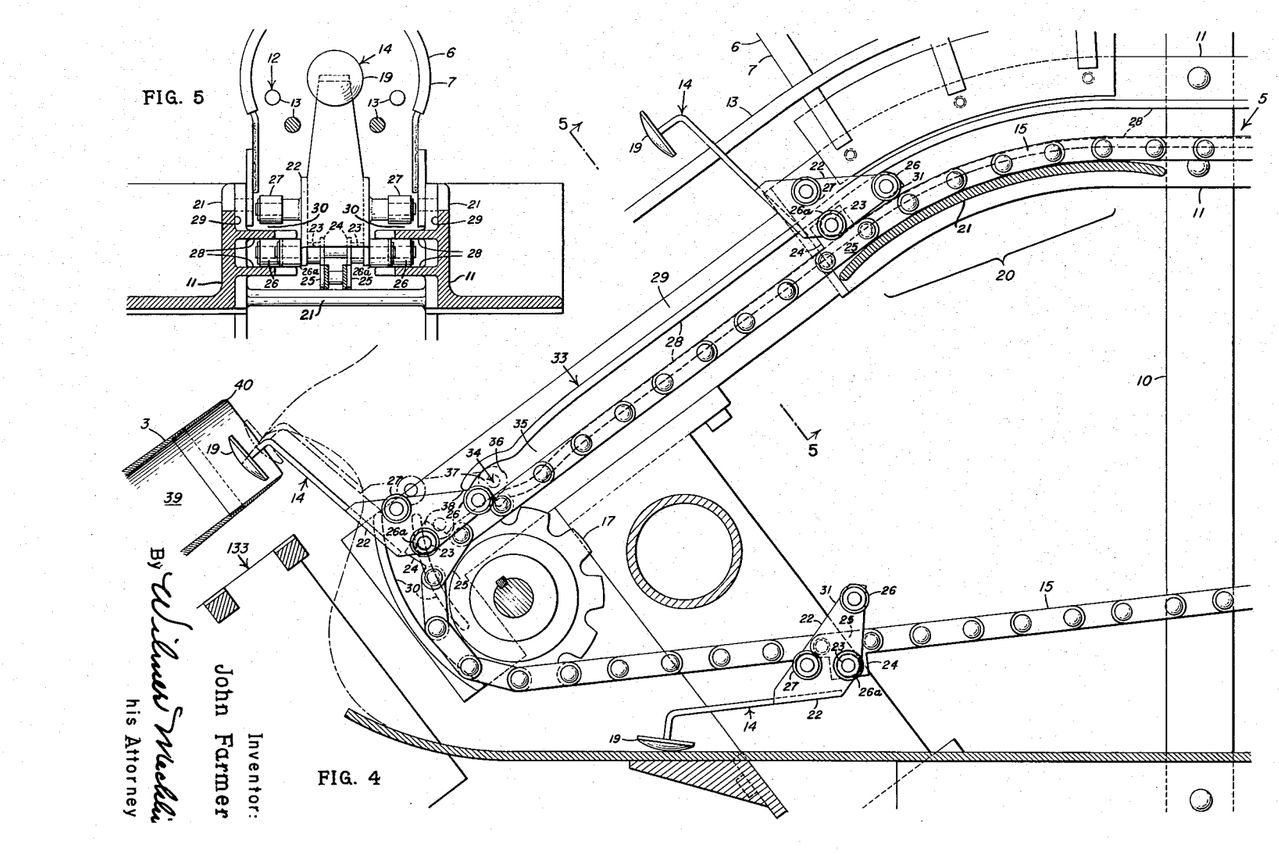
FIGURE 4 is a fragmentary view on an enlarged scale of the adjoining portions of the feed conveyor, and sizing knife, with parts broken away and shown in section to more clearly indicate certain of the details of construction.
FIGURE 5 is a fragmentary sectional view taken along the lines 5—5 of FIGURE 4.

Either a downwardly arched or bowed reverse bend, if only including the entrant and intermediate legs 35 and 36, or an S-bend, if exit leg 37 also is included, the camming slot 34 in conjunction with the drive sprocket 17 effectively accelerates each pusher head and, correspondingly, the pineapple pushed thereby as the sized pineapple passes through the sizing knife 3 into the transfer passage 39 and by thereafter starting its retraction, clears the head of the knife and associated structure as the head continues to turn about the drive sprocket 17. The position of a pusher at the stage at which it has completed its pushing of a pineapple through the sizing knife and the path of travel of a pusher head during the period in which it is under control of the camming slot 34 and the cam slot 30 are shown in dot-and-dash lines in FIGURE 4. Even the comparatively slight curvature, inclination or gradient of the illustrated accelerating leg 36 there shown, in conjunction with the swinging of the pusher about the drive sprocket, will accelerate each pusher, at the moment its pineapple passes through the sizing knife 3, to a velocity of about 2½ times the linear velocity of the drive chain 15 and correspondingly greater than the velocity at the same moment of conventional pushers, such as shown in the Fox patent. This increase, by the joint action of the camming slot 34 and the drive sprocket 17, or by the action of the drive sprocket, alone, if the machine is operating at sufficiently high speed, is of prime importance in the operation of the present machine, since it enables the corresponding increase in the kinetic energy of a sized pineapple to be applied entirely to transfer of the pineapple from the sizing knife 3, through the intervening enclosed cylindrical transfer passage 39, to fully seated position in the presented barrel 32 of the turret 4. In such transfer the increase in the force applied by the pusher 14 is augmented by the force of gravity resulting from the downward inclination of the sizing knife 3 and the turret 4.

The inclination of the sizing knife 3, transfer passage 39 and turret 4 at the same angle as a means of obtaining a gravitational force to assist in transferring a sized pineapple from the sizing knife into the turret is not, itself, new, but the particular inclination heretofore used has been selected ill-advisedly. The accepted angle of inclination is 30°. When it is considered that the angle of repose of the average pineapple is about 15°, half of the total inclination is used in overcoming frictional resistance and only the remaining 15° is left to provide the transfer force. It is the small margin of safety left the gravitational force at the 30° incline and the inadequacy of the force applied by the pushers that has plagued the industry with so-called "doubles" or "blockages" in the transfer passage, with consequent fruit loss as the blocking pineapple, under the push of a succeeding pineapple, is forced from the passage to the turret out of cycle with the latter and that has been responsible for the use, as attempted solutions, of complicated but inadequate arrangements, such as applying air pressure to the sized pineapples in the transfer passage.

As opposed to previous machines, the improved machine of this invention, even though the downward inclination of its sizing knife 3 and turret 4 were the customary 30°, would have a much greater margin of safety in transferring sized pineapples from the sizing knife 3 to the turret 4 because of the increased velocity of the pusher heads 19 at the point of disengagement and consequent increase in the kinetic energy of each sized pineapple at the start of the transfer. However, it is preferred to increase this margin still further to make absolutely certain that each pineapple will be transferred in time relation to the cycle of the turret 4 without interruption of the transfer either in the presented barrel 32 of the turret or in the transfer passage 39.

The preferred increase in the margin of safety in transferring pineapples from the sizing knife 3 into the turret 4 is obtained by increasing the downward inclination of the transfer passage 39 beyond the usual 30°. The increase in inclination, angularity or obliquity should not be large, else it would complicate the operations required to be performed on pineapples in the turret 4. Nor need the increase be large, since it is the effective inclination, rather than the total inclination, including the 15° required to overcome friction, that is of moment and each degree added to the usual 30° increases the effective inclination by 6⅔%. Consequently, a relatively small increase in the total inclination will suffice, with impairment of the operations performed on the turret determining the upper limit. The preferred total inclination is in the range of 35–45°, this bracketing the 37° inclination of the transfer passage of the illustrated embodiment which has performed admirably in service.

The significance of the increases in the velocity of the pusher heads 19 and the inclination of the transfer passage 39, in their combined effect upon the operation of Ginaca machines, can best be appreciated from the following table comparing the transfer characteristics of the illustrated form of the improved machine and a conventional Ginaca machine of the 1925 model having a transfer passage of 30° inclination and a feed conveyor of the type shown in the Fox patent, both machines being cycled for feeding at a rate of 100 pineapples per minute.

COMPARISON OF TRANSFER CHARACTERISTICS OF MACHINES

|  | Improved | Conventional |
| --- | --- | --- |
| Initial transfer velocity (ft./sec.) | 6.95 | 2.78 |
| Acceleration down incline (ft./sec.²) | 12.4 | 8.6 |
| Time to start entering turret-$t_1$ (sec.) | .19 | .35 |
| Cycle degrees for $t_1$ | 114 | 209 |
| Total transfer time-$t_2$ (sec.) | .284 | .491 |
| Cycle degrees for $t_2$ | 170 | 295 |
| Final velocity (ft./sec.) | 10.47 | 6.98 |
| Kinetic energy at start of transfer | 24 M | 3.9 M |
| Kinetic energy at end of transfer | 55 M | 24 M |

As the above table indicates, there is a somewhat greater increase in the kinetic energy of a pineapple during transfer, in terms of its mass M, in the improved machine than in the conventional machine due to the greater inclination of the former. However, the most significant values are those of the kinetic energy at the start of the transfer, 24 M for the improved machine and only 3.9 M for the conventional machine. It is these energies, the results of the forces applied by their respective pushers to the pineapples as, on being sized, they leave or pass the cutting edge 40 of the sizing knife 3, that mainly spell the difference between the efficiency of the improved machine and the marginal character of the conventional machine in transferring pineapples to the turret and the reason why such crutch-like devices as pressure and vacuum have been resorted to as transfer assistants in conventional machines. The increase in the kinetic energy of the sized fruit during transfer obtained in the improved machine not only ensures its efficient operation but affords a sufficient factor of safety to enable the clearance on the diameter between the fruit and the sizing knife 3 and transfer passage 39 to be reduced from the usual ⅛″ to as little as 1/64″ with consequent reduction in fruit loss and greater preciseness in the sized fruit.

In a pineapple processing plant, the pineapples are ordinarily fed from a distribution conveyor system down chutes to the individual Ginaca machines. While the feed conveyor 5 could be top-loaded directly from such a chute at each of its one or more feeding stations, it is preferred to interpose between each loading station and its chute (not shown) an intermediate or infeed conveyor 41. Conveniently a conveyor of the endless bar type, the transverse feeding bars 42 of which are connected between endless chains 43 and ride in their advance flight over a support plate 44, each infeed conveyor 41 will have its feeding bars so spaced as to accommodate therebetween the pineapples being processed and be so inclined upwardly from the chute to the feed conveyor that each pineapple will rest or fall back against its feeding bar. With such an infeed or auxiliary conveyor 41 it is simply a matter of synchronizing the speeds of the main and auxiliary conveyors, to ensure that the pineapples, when loaded onto the main conveyor, will be lined up, each with its butt end against one of the pushers 14. It is also possible to render the feeding from the chute or chutes to the feed conveyor 5 substantially automatic by providing each chute with a curved bottom trough (not shown) underlying the feed end of and inclined downwardly toward the related infeed conveyor 41, so that the fruit will roll downwardly, one at a time into the spaces between the bars 42.

Figure 1:
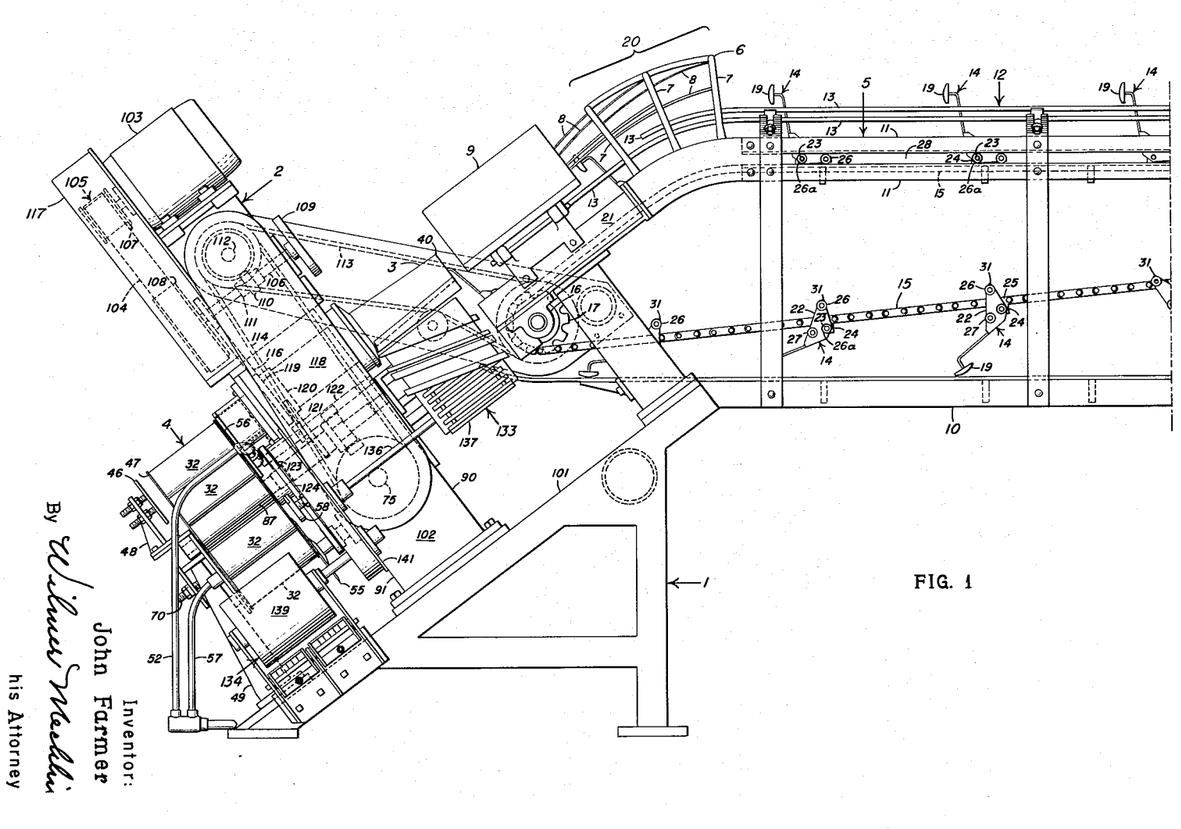
FIGURES 1 and 2 are, together, a side elevational view of a preferred embodiment of the fruit treating machine of the present invention.
Figure 2:
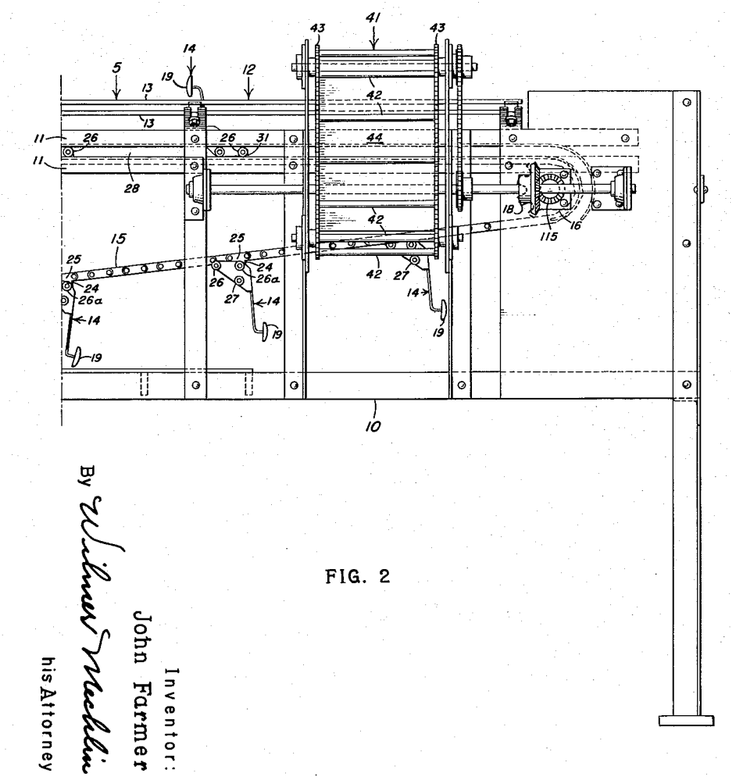
Figure 3:
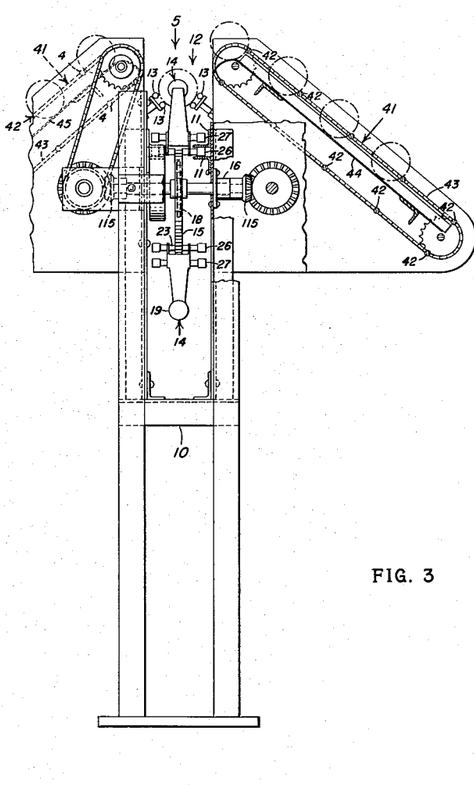
FIGURE 3 is a fragmentary end elevational view from the feed end of the machine of FIGURE 1.

Since a single infeed conveyor 41, whether manually or substantially automatically fed, can readily load only about 120 pineapples per minute, and the improved machine is capable of much higher operating speeds, it is preferred, as in the illustrated embodiment, to provide the machine with at least two infeed or cross elevators each supported on the frame 10 and feeding from opposite sides onto the feed conveyor 5 at right angles or normal thereto. With this dual arrangement shown in FIGURES 2 and 3 and the cross elevators 41 synchronized in drive with the feed conveyor 5 so that each will load alternate spaces between the pushers 14, the machine can readily be operated with two loading operators at speeds at least as high as 220 pineapples per minute.

Topped before delivery to the distribution system and loaded, crown end first, onto the feed conveyor 5 by one or the other of the cross elevators 41, pineapples are fed by the feed conveyor to the sizing knife 3, and after having their shells cut off in sizing them to the diameter desired in the particular slice pack, are projected, propelled or forced down the transfer passage 39, each into a confronting, then uppermost, barrel 32 of the turret 4 against a stop 46. In a conventional machine the first operation on a pineapple after it has been seated in a barrel in the turret is to make a butt cut by blowing or otherwise forcing the pineapple, during the first independent movement of the turret back up against a stop confronting and spaced from the latter's inlet end and while the butt end is so exposed, cutting it off by a fixed or rotary butt cut knife. This usual procedure not only involves movement of the pineapple in reverse immediately after it has been received or seated in the turret, but also requires that the depth or length of the barrel, and thus the axial dimension of the turret, be sufficient to accommodate the whole pineapple.

As opposed to the above procedure, the first operation performed on a pineapple in the turret 4 of the machine of this invention is to make a crown cut. This is accomplished by using as the stop 46 against which the crown end of a pineapple abuts at the end of the transfer, a substantially flat-faced stop or positioning plate confronting and normally spaced from the rear end or face 47 of the turret and disposed substantially perpendicular or normal to the turret's axis. The stop 46 may be the illustrated rigid plate or a dashpot or otherwise suitably cushioned stop, the latter being of advantage, particularly in high speed operation, to prevent a pineapple from bouncing back into the transfer passage 39 and being cut in two in the first indexing movement, as sometimes happens in present machines. In either case adjustable in spacing axially of the turret relative to the rear end 47, conveniently by adjustably mounting it on a bracket 48 fixed to and surmounting a rear upright 49 of the stand 1, the stop plate 46 is disposed, radially and circumferentially of the turret to confront and overlap the rear end of the initially uppermost barrel 32 in which a pineapple is received at the end of the transfer from the sizing knife 3, over the first, or if desired, the first and second indexing movements of the turret. With the stop plate 46 so disposed, the crown end of the pineapple, instead of being contained in the barrel at the end of the transfer, will project therebeyond a distance predetermined by the setting of the plate and thus be presented or exposed for one or in sequence a plurality of crown cuts.

Figures 6, 12:
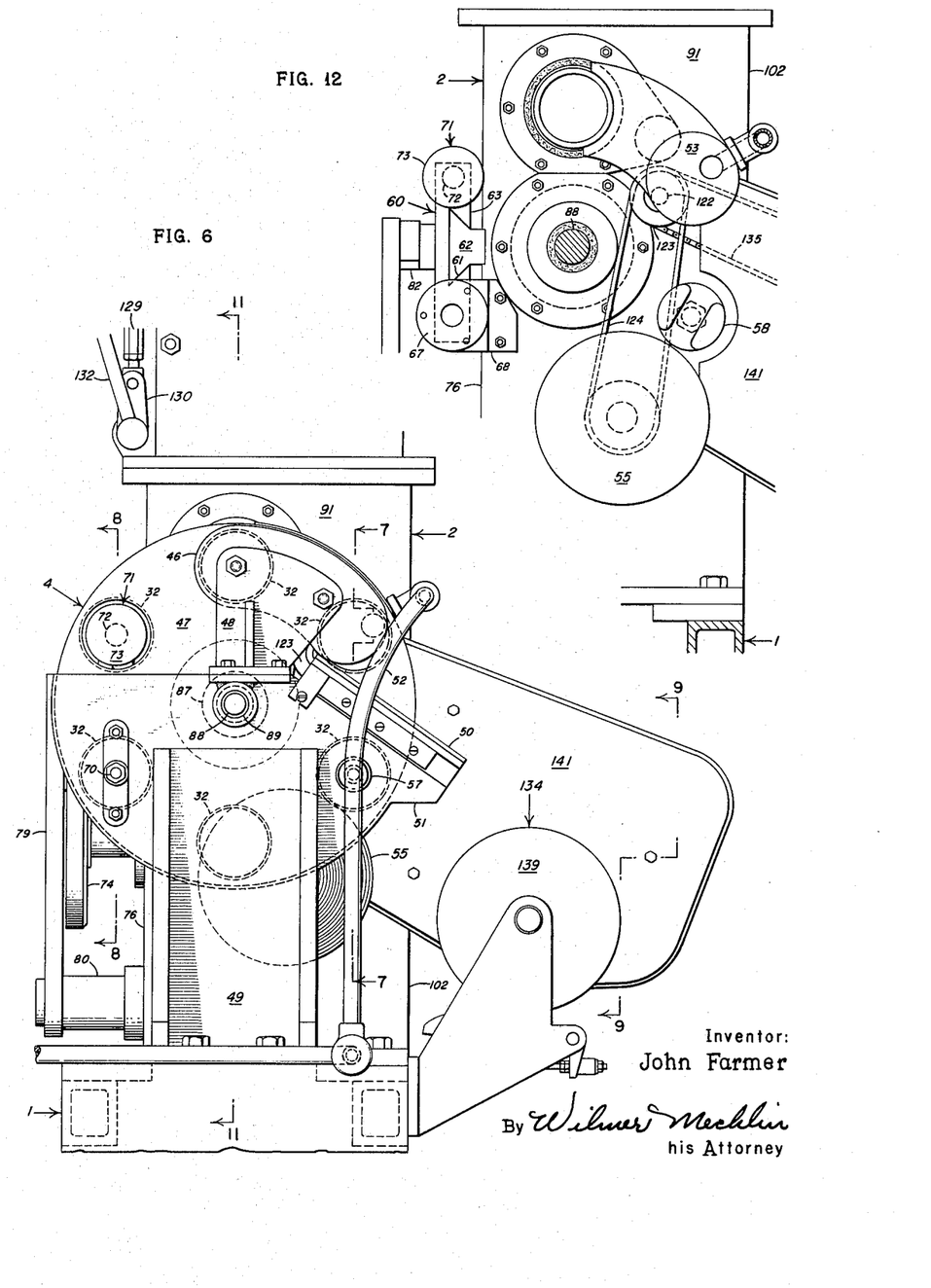
FIGURE 6 is a fragmentary end elevational view of the discharge end of the machine on a scale between that of FIGURES 1 and 4.
FIGURE 12 is a fragmentary sectional view taken along lines 12—12 of FIGURE 11.
Figure 7:
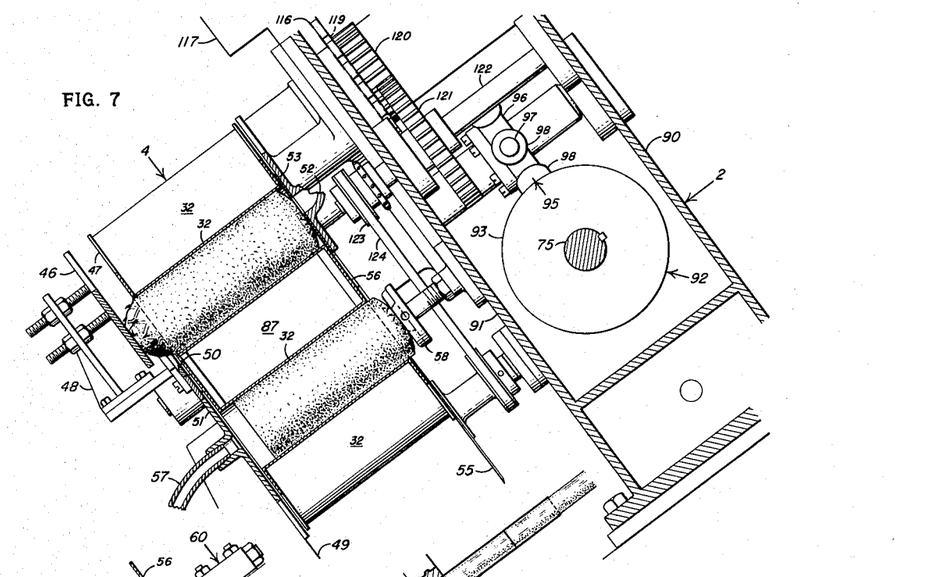
FIGURE 7 is a fragmentary vertical sectional view taken along lines 7—7 of FIGURE 6.
Figures 8, 9:
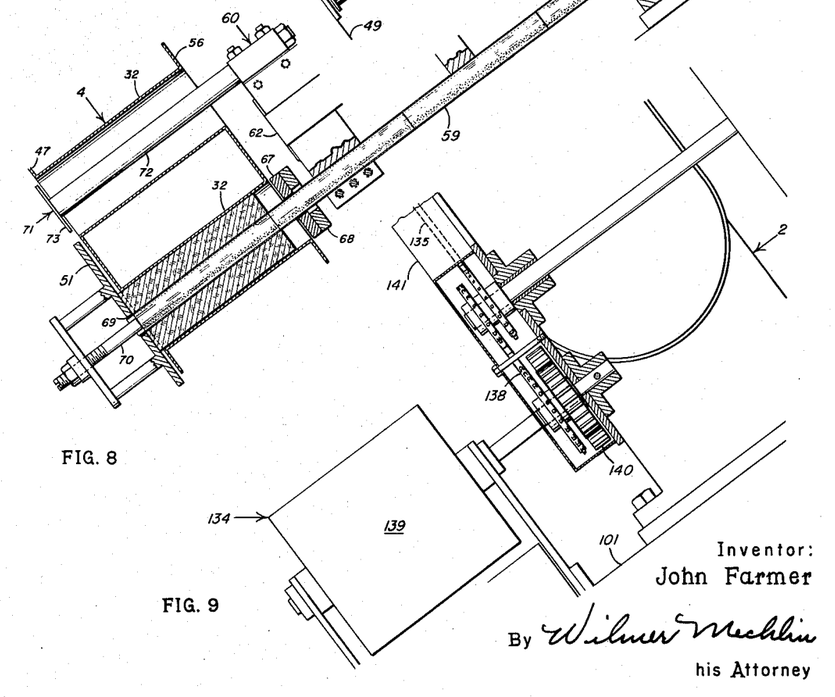
FIGURE 8 is a fragmentary vertical sectional view taken along lines 8—8 of FIGURE 6.
FIGURE 9 is a fragmentary vertical sectional view taken along lines 9—9 of FIGURE 6.
Figure 10:
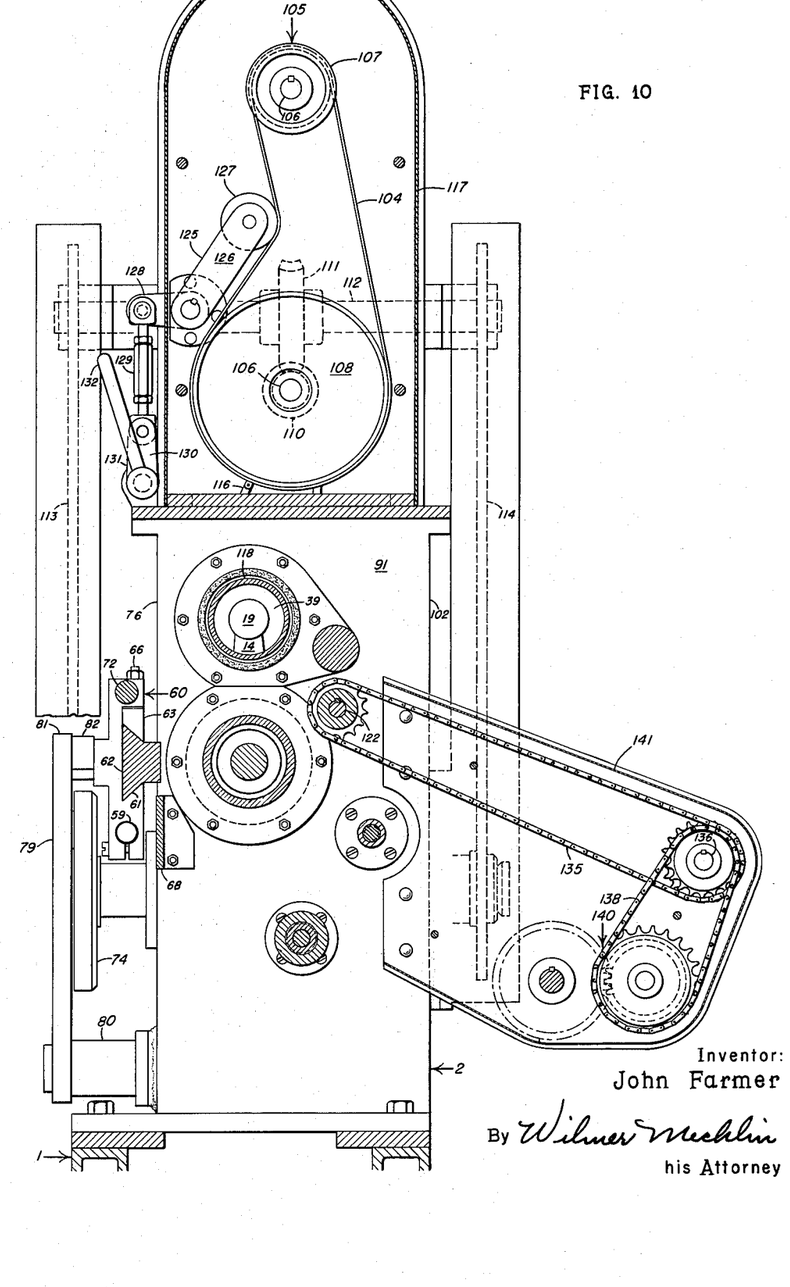
FIGURE 10 is a fragmentary sectional view on the scale of FIGURE 6, taken along lines 10—10 of FIGURE 11.
Figure 11:
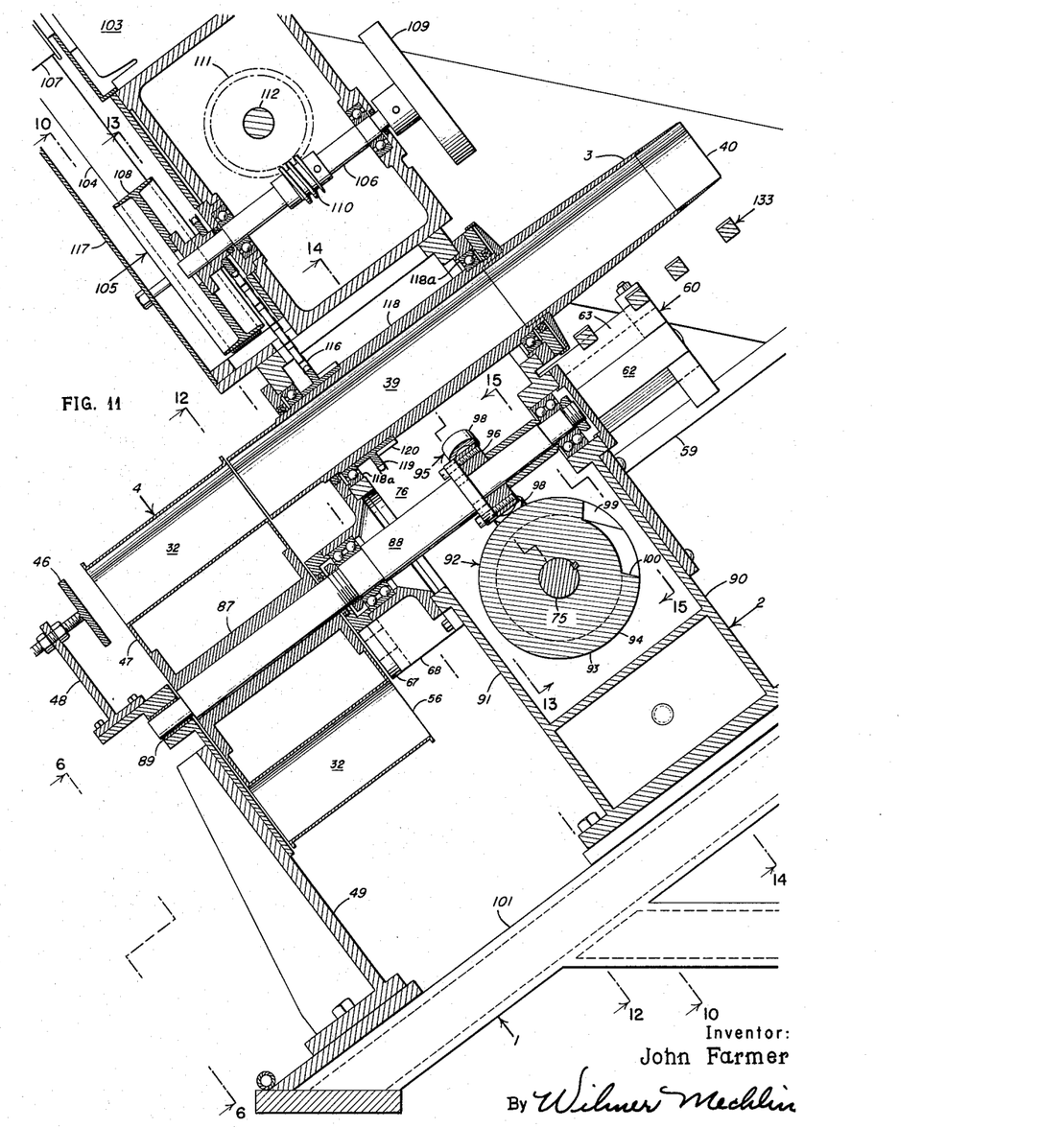
FIGURE 11 is a fragmentary vertical sectional view taken along lines 11—11 of FIGURE 6.
Figure 13:
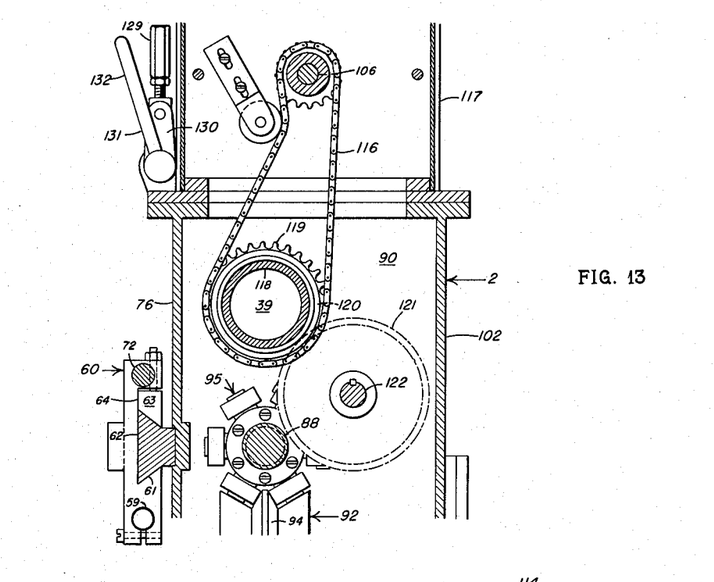
FIGURE 13 is a fragmentary sectional view taken along lines 13—13 of FIGURE 11.
Figures 14, 15:
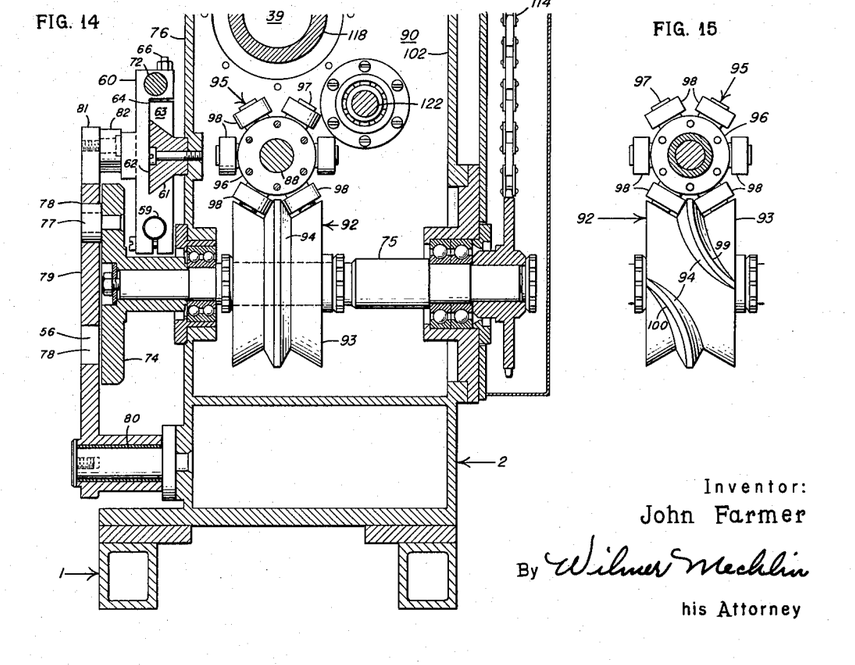
FIGURE 14 is a fragmentary sectional view taken along lines 14—14 of FIGURE 11.
FIGURE 15 is a fragmentary sectional view taken along lines 15—15 of FIGURE 11.

While a plurality of crown cuts, each cutting off a portion of definite thickness from the crown end of a pineapple, is desirable at times when the pineapples being harvested are relatively short-bodied and taper excessively toward their crown ends, a single crown cut ordinarily will suffice. Thus, although a pair or plurality of crown cut knives 50 of either the fixed or rotary-type might be provided, one between the first and second and the other between the second and third stops or rests or stop or rest positions in the operating cycle of the turret, to make successive crown cuts, the illustrated embodiment as shown in FIGURES 6 and 7, has but one crown cut knife, the latter conveniently being a fixed knife inclined in the direction of movement of the turret and mounted on a generally semi-circular mounting plate 51 supported by the rear upright 49 and disposed to make a single end cut between the second and third stops in the turret's cycle. The forces of gravity on the pineapple due to the downward inclination of the axis of the turret will ordinarily hold its crown end against the stop plate 46 in the position for the crown cut, but, if desired, this force may be supplemented, as here, by applying air pressure to the butt end of the pineapple at the second stop of the turret through piping 52 having an outlet in a sealing or blowing plate 53, otherwise closing the front end of the barrel at that stop position.

Whether it makes one or a plurality of crown cuts, the present machine in making a crown cut at the outset of the operating cycle of the turret has the advantage over prior machines of utilizing the forces by which a pineapple is transferred from the sizing knife 3 to the turret to position the pineapple for the initial turret operation, rather than partially wasting those forces by forcing a pineapple back up the turret for butt cut immediately after it has been seated in the barrel. A further advantage of the present arrangement is that since the crown end of a pineapple is initially projected beyond the outlet end of the associated barrel 32 to present it for the crown cut, the barrel need only be of sufficient length to accommodate the portion of the pineapple remaining after the first crown cut enabling the axial dimension of the turret to be reduced, with resultant saving in weight and cost.

Following the crown cut or cuts, the turret 4, rotating or turning clockwise as viewed in FIGURE 6, is indexed to enable the operating devices associated therewith in succession to cut the butt end from the pineapple, core the resulting fruit cylinder, and finally discharge the cored cylinder from the turret for further treatment. To perform these several operations the illustrated turret, all told, has six stops or stop positions in its operating cycle, at the first or first and second of which the pineapple is positioned for the crown cut or cuts in the manner just described. In the third stop of the turret the pineapple is prepared or made ready for the butt cut by blowing or otherwise forcing it back up the barrel to project its butt end from the barrel's inlet end for cutting by a butt cut knife 55 positioned at the front end or face 56 of the turret. Here air is used as the forcing means and the mounting plate 51, which over its extent parallels and lies closely adjacent the rear end 47 of the turret 4, as the sealing or covering means, the air being applied through piping 57 which opens through the mounting plate in axial alignment with the presented barrel in the third stop position of the turret. As in the case of the crown cut or cuts, the thickness of the butt cut is determined by a stop or limiting or positioning plate 58 confronting and adjustable in axial spacing relative to the opposite or inlet end of the presented barrel 32 and conveniently mounted for such adjustment on the central housing 2. If desired, the stop 58 may be extended circumferentially of the turret for locating a pineapple for a plurality of successive butt cuts by a corresponding number of butt cut knives. However, one butt cut, made by a single butt cut knife 55, will ordinarily suffice and the illustrated machine is so arranged. The butt cut knife 55 here used, as shown in FIGURE 7, is a rotary, rather than a fixed knife, which rotates about an axis parallel to the turret's and is positioned at the front end 56 of the turret to engage and cut off the butt end to the extent predetermined by the setting of the stop 58 during indexing of the turret between its third and fourth stops.

The rotary knife 55 of the illustrated embodiment covering the third stop of the turret 4, the next operation on the fruit cylinder is performed at the fifth stop while the turret is at rest. This operation is coring of the fruit cylinder and it is performed by a cylindrical coring tube 59 with the turret at rest and the cylinder held by engagement of its crown end by the mounting plate 51 against displacement from its barrel 32. Concentric with, and reciprocally axial of the barrel 32 presented at the fifth stop of the turret 4, the coring tube 59 may be guided precisely in its reciprocal movement by providing it with a slide or a carriage 60 having an undercut groove 61 of inverted V-shape in which is slidably received a correspondingly configured guide or slide block 62 bolted or otherwise secured to an adjoining side of the housing 2 and extended therealong parallel to the axis of the turret 4. For ready application and removal of the slide 62, as well as to compensate for any wear between the slide and the guide block 62, one side of the groove 61 in the slide preferably is formed by a retaining, locking or adjusting block, gib member 63 normally inset or seated in a seat 64 in the slide proper at a side of the groove 61 and both held in assembed relation and adjustable transversely of the slide to vary the width of the slot by suitable means, such as the holding and adjusting bolts, 65 and 66, respectively, shown in FIGURE 17. The holding bolts 65, while holding the retaining block in its seat, have limited play transversely of the slide to enable the retaining block 63 to be shifted transversely by the adjusting bolts to the extent desired.

Clamped to the carriage 60 at one side of, here below, the guide block 62, the coring tube 59 also preferably is guided by a centrally apertured guide disc or plate 67 through which it slides and which conveniently is formed as an integral part of a guide bracket 68 fixed to a side of the housing 2 confronting the turret 4. Covering and lying closely adjacent the inlet end of the barrel 32 presented at the fifth stop of the turret, the guide disc 67 serves, on retraction or withdrawal of the tube at the end of the coring operation, to retain the cored fruit cylinder in the barrel. Open-ended and of a length to hold in tandem the cores of several fruit cylinders, the coring tube 59, once filled, progressively ejects cores at the rear as each new core is received in its front or cutting end. However, it is desirable not only that the coring tube automatically eject cores preceding fruit cylinders but also that its free end portion be cleared at the end of each operation to ensure that it will core each cylinder cleanly and without bruising the fruit. This is accomplished by extending the advance stroke of the coring tube to cause the latter toward the end of that stroke to project beyond the presented barrel 32 through an aligned opening 69 in the mounting plate 51 and have its front end slide over to receive a thrust pin 70 concentrically mounted on the outside of the mounting plate.

By mounting it intermediate to the fifth and sixth stops of the turret 4, the slide 60 is enabled, itself, to mount not only the coring tube 59 but, as well, a discharge piston or plunger 71, the shaft 72 of which is clamped to the slide at the opposite side of the latter from the coring tube in axial alignment or concentric with the presented barrel at the sixth position of the turret and the head 73 of which is of a diameter to enter and force the cored fruit cylinder from the outlet end of the barrel for further treatment. Positioned axially of the turret to enter the barrel presented at the sixth stop as the coring tube 59 enters the barrel at the fifth stop, the plunger is adapted to discharge or eject a cored fruit cylinder coincident with coring of the succeeding cylinder by the coring tube. As will be appreciated, both the strokes and lengths of the coring tube 59 and discharge plunger 71 will be shorter than those on a conventional Ginaca machine because of the reduced length of the turret made possible by crown cutting the pineapple at the outset of the operating cycle of the turret. Too, this increased inclination of the turret, as well as the transfer passage 39 and sizing knife 3, causes the cored fruit cylinders practically to eject themselves from the turret at the last stop in the latter's cycle, with consequent reduction in the pressure required to be applied by the discharge plunger 71. This is of particular advantage in enabling the machines to be operated at high speeds without risk of damage to the butt ends of the fruit cylinders during ejection.

For reciprocating the slide 60, and with it the coring tube 59 and discharge plunger 71, it is preferred to employ a crank or crank wheel 74 mounted on and keyed or otherwise fixed against relative rotation to an end of a shaft 75 journaled in opposite sides of and extending through the housing 2 normal or perpendicular to the axis of the turret 4. Mounted on the outside of the same side 76 of the housing 2 to which the slide 60 is attached, the crank 75 has a crank or eccentric pin 77 preferably in the form of a roller, which rides or slides in a cam slot 78 in a crank lever or rocker arm 79. Oscillatably, rockably, swingably or pivotally mounted on a pivot 80, outstanding or projecting outwardly from the side 76 of the housing 2 below the crank 74 parallel to and centered transversely of the housing on the shaft 75, the crank lever 79 projects or extends above the crank and at its upper or free end 81 is connected by a link 82 to the rear end of the slide 60.

Figures 16, 17:
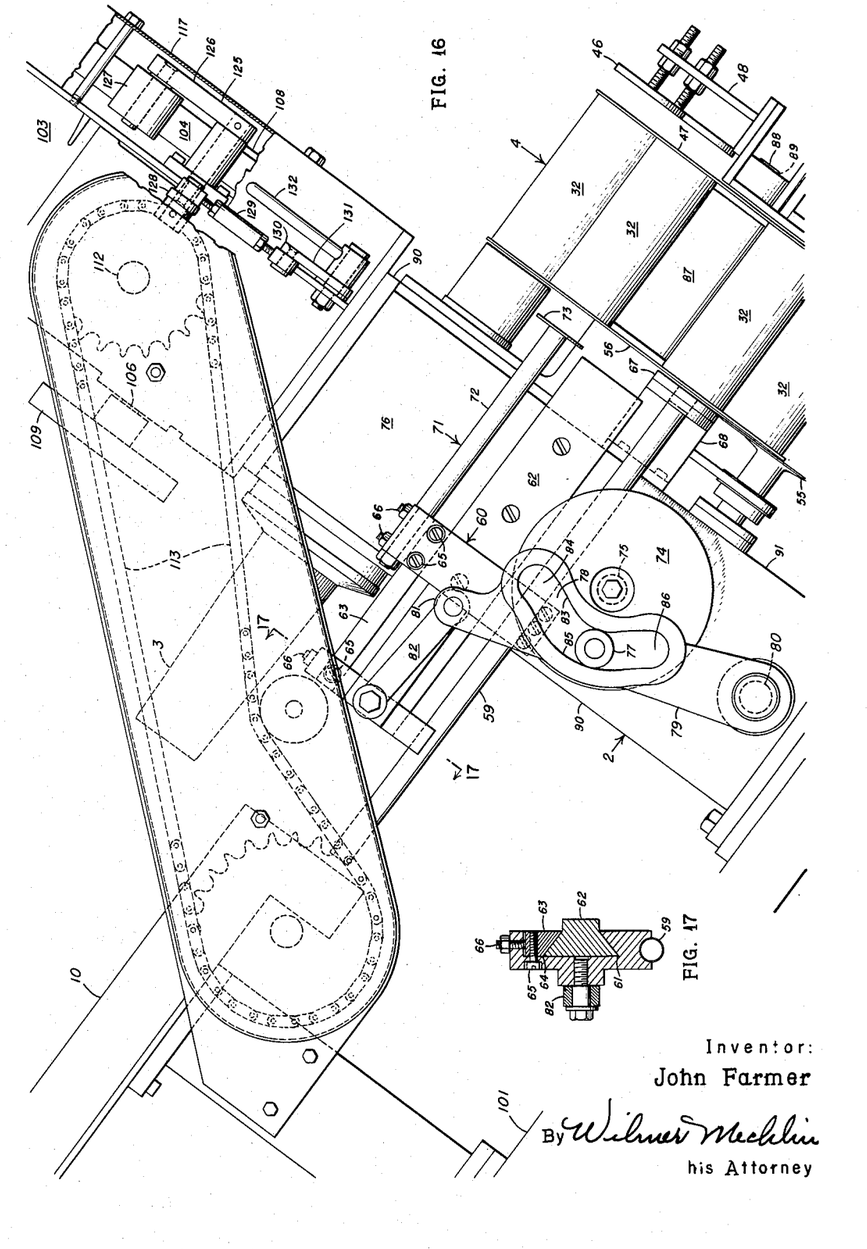
FIGURE 16 is a fragmentary side elevational view on the scale of FIGURE 6, of the far side of the portion of the machine shown in FIGURE 1, with portions broken away and shown in sections to more clearly illustrate certain of the details of construction.
FIGURE 17 is a fragmentary sectional view taken along lines 17—17 of FIGURE 16.

The illustrated mechanism for reciprocating the slide 60 is capable not only of translating the rotary movement of the shaft 75 into reciprocating movement of the slide but of minimizing damage to the fruit by the coring tube 59 and discharge plunger 71 by varying the speed of the slide in its advance and return or retreat strokes to effect a slow advance and quick return. This latter achievement is made feasible by the preferred indexing drive for the turret 4, hereinafter to be described, and is derived directly from synchronization of the crank 74 with that drive, the shape of the cam slot 78, and the pivotal mounting of the crank lever below the crank. As shown in FIGURE 16, in which the slide is in its retracted, at rest or normal position, the cam slot 78 is arcually concave rearwardly and of a length and disposition to encompass or accommodate movement of the crank pin 77 in the portion of the latter's circular path in which the turret 4 is indexing between stops. Rotating clockwise, as viewed in FIGURE 16, the crank pin 77, once the turret has indexed to a stop, will apply force to the rear wall 83 of the upper leg 84 of the cam slot 78 and start the rearward swing of the crank lever 79 responsible for the advance stroke of the slide 60. This rearward swing of the crank lever continues until the slide has reached the end of its advance stroke, whereupon the crank pin engages the front wall 85 of the lower leg 86 of the cam slot and starts the retraction of the slide. Moving adjacent and remote from the pivot 80 of the crank lever 79, respectively, during the retract and advance strokes of the slide 60, the crank pin 77, even though moving at uniform speed, thus produces the desired slow advance and quick return strokes of the slide.

As mentioned earlier, the turret of the present machine is able to be made relatively short, since its barrels 32 need only be of sufficient length or depth to accommodate or contain the sized pineapples after their crown ends have been cut off, rather than before such cutting, as in previous machines. So shortened and correspondingly lightened, the turret 4 is readily formable of a hub 87 mounting at opposite ends, end discs or plates serving, respectively, as the turret's front and rear ends or walls 56 and 47. Axially spaced and substantially flat and parallel, the end discs 56 and 47 support in circumferentially spaced relation about the hub 87 the ends of the multiplicity of open-ended barrels 32. The number of the barrels correspond to that of the stops or dwells in the operating cycle of a given turret, there thus are six barrels in the six-stop turret of the preferred embodiment.

The turret 4 rotates or turns on and is driven through a spindle or shaft 88 to which its hub is keyed or otherwise fixed against relative rotation. Extending longitudinally of the stand 1 and inclined at an oblique angle, which in accordance with the preferred inclination of the turret 4 and transfer passage 39, is about 37°, or somewhat more than double the 15° average angle of repose of a pineapple, the spindle 88 extends rearwardly through the turret and is supported at the rear thereof, suitably in a bushing 89 in the mounting plate 51. Forwardly of the turret 4 the spindle 88 projects or extends into the housing 2 and at its front end and intermediate its ends is journaled in or rotatably mounted or supported on the housing's front and rear walls 90 and 91, respectively.

Although the turret 4 might be indexed by a geneva drive or an interrupted gear mechanism, such as have heretofore been used for indexing the turrets of Ginaca machines, it is preferred to employ a Ferguson cam and roller gear drive of the type shown in FIGURES 11 and 13–15 because of its relatively long dwell and smooth acceleration and deceleration during indexing. Designated generally as 92, the preferred indexing drive is comprised of a cam 93 mounted on and keyed to an input or cam shaft, preferably the shaft 75 mounting the crank 74. This preferred mounting of the cam and crank on a common shaft in the central housing 2 is of prime importance in enabling several drives in present machines to be eliminated entirely, with correspondingly simpler construction, more precise operation and easier maintenance. So mounted, the cam 93 has an interrupted circumferential cam rib 94 which is straight intermediate its ends and has its ends curved or turned oppositely toward opposite faces of the cam. The camming action of the rib 94 is transmitted to the spindle 88 of the turret 4 through a roller gear 95 having a hub 96 fixed to the spindle and carrying a multiplicity of radially projecting, circumferentially spaced arms 97, each rotatably mounting an anti-friction roller or cam follower 98. In this drive the number of the cam followers 98 corresponds to the number of stops desired in the operating cycle of the turret and the followers and the cam rib 97 are so constructed and arranged that the rib is gripped between and in rolling contact with a pair of followers. This relation between the followers and the rib obtains, except midway of the indexing period, when the rib 94 is in contact with three of the followers as its out-turned trailing end 99 is disengaged by one pair of followers simultaneously with engagement of its oppositely out-turned leading end 100 by another pair of followers, the intermediate roller being common to both pairs.

Having a modified trapezoid acceleration characteristic and a relatively short indexing period, 120° for the six-stop operating cycle of the turret of the illustrated embodiment, the indexing drive 92 in each revolution of the cam 93 provides a dwell or stop in which the turret is effectively locked against rotation and thereafter indexes the turret 60° to the next stop. The relatively long dwell period, coupled with the mounting of the cam 93 and the crank 74 on the common combined cam and crank shaft 75, both ensures synchronization of the coring and discharge operations with the indexing of the turret and provides ample time for the relatively slow advance strokes of the coring tube 59 and the discharge plunger 71. The relatively long dwell of the turret in each stop, in conjunction with the positive transfer in a relatively short time of each pineapple from the sizing knife 5 into the presented barrel 32 of the turret, due to the acceleration given the pushers 14 at the end of their advance flight and the increase in inclination of the knife, transfer passage 39 and turret 4, also permit positive synchronization of the feed conveyor 5 and the turret with a definite lead time between the release of a pineapple by each pusher and its seating in the presented barrel. It is this that gives the present machine a production potential in excess of 180 fruit per minute, far higher than the maximum heretofore considered attainable of about 105 fruit per minute.

The preferred rigid housing 2, in keeping with an objective of this invention, not only mounts the drive mechanism for the coring tube 59 and the discharge plunger 71 and the indexing drive 92 for the turret 4, but mounts and largely houses or encloses the drives, or at least the power take-offs, of all of the operating parts or components of the machine. The housing 2 itself is bolted or otherwise fixed and upstands substantially perpendicular or normal to an inclined upper face 101 of the bedplate, the inclination of which, to facilitate mounting and alignment of the operating parts, corresponds to that of the turret 4 and transfer passage 39. So mounted and enclosed at the sides by its front and rear walls 90 and 91 and side walls 76 and 102, the housing 2 mounts at the top or is surmounted by an enclosed or housed electric motor 103 preferably of sufficient power to drive all of the operating parts of the machine.

The motor 103 is drivably connected by a belt 104 of an enclosed reduction belt drive 105 to an underlying shaft 106 extending longitudinally through and journaled in the front and rear walls 90 and 91 of the housing 2. Carrying at its end below the take-off pulley 107 of the motor 103 the driven pulley 108 of the drive 105, the shaft 106 carries at its opposite end a hand wheel 109 for manual adjustment of the drive and, intermediate its end within the housing 2, a worm 110 of a reduction worm gear 111 by which it is drivably connected to an overlying take-off shaft 112. Extending transversely through and journaled in the side walls 76 and 102 of the housing 2, the take-off shaft 112 has its opposite ends drivably connected outside the housing to the drive sprocket 17 of the feed conveyor 5 and to the combined cam and crank shaft 75 by enclosed chain drives 113 and 114, respectively, the former of which, through the feed conveyor's idler sprocket 18 and a suitable take-off 115, also serves to drive the cross elevators 41 in synchronization with the feed conveyor. Required to be driven at a relatively high speed, the rotary sizing knife 3 is driven directly off the shaft 106 by a chain drive 116 enclosed in part by the cover 117 for the belt drive 105 and, therebelow, by the housing 2.

To facilitate driving connection of the rotary sizing knife 5 to the shaft 106 by the chain drive 116 but, more importantly, to protect a sized pineapple from contamination as it passes from the sizing knife to the turret 4 through the transfer passage 39, the latter is enclosed or contained by and is the bore or throat of a barrel or tube 118, which projects or extends rearwardly through the housing 2 in axial alignment or coaxial and preferably rigid or integral with the sizing knife and forming a rearward extension thereof. With the preferred construction of the sizing knife 3 and barrel 118 and the latter journaled in anti-friction bearings 118a in the front and rear walls 90 and 91 of the housing, driving connection of the sizing knife 5 to the shaft 106 simply is a matter of encircling and fixing to the barrel 118 of the knife the driven sprocket 119 of the chain drive 116. The barrel 118 of the sizing knife 3 also is made to serve as part of the drive of the rotary butt cut knife 55 by fixing about the barrel within the housing 2, a gear wheel 120 intermeshing with a second gear wheel 121 fixed to a take-off shaft 122 journaled in and projecting rearwardly through the housing below the barrel. This last shaft 122, rearwardly of the housing 2, mounts a take-off pulley 123 which is drivably connected to the butt cut knife 55 by a belt drive 124.

With all of the operating parts positively related in their speeds by chain or gear drives through the shaft 106, except for the rotary butt cut knife 55, and a positive driving relation between the latter and the remaining operating parts not necessary, the preferred drive arrangement, above described, not only is much simpler than those heretofore employed in Ginaca machines, but renders it easy to synchronize the movements of the cross elevators 41, the feed conveyor 5, the turret 4, the coring tube 59, and the discharge plunger 71, which must be positively related to their movements for the machine to operate efficiently.

Other than the belt drive 124 for the butt cut knife 55, the only belt drive employed in the preferred drive arrangement is the belt drive 105 between the motor 103 and the interrelating shaft 106. In this application a belt drive has the advantage over a chain drive that it can serve dually as a drive and as a clutch to disengage the motor in case of any malfunctioning of the machine. To enable it to perform as a clutch, the belt 104 of the drive 105 is of such length that, if untensioned, it will slip on the pulleys 107 and 108 and so disengage the motor 103 from the shaft 106. For tensioning the belt there is pivotally mounted on the rear wall 91 of the housing 2 inside the cover 117 a bellcrank 125, the inner arm 126 of which carries a roller 127 pressable against the side of the belt and the outer arm 128 of which is pivotally connected to one end of an adjustable link 129. At its opposite end the link 129 is pivotally connected to an arm 130 of a second bellcrank 131, the latter being pivotally mounted exteriorly on the housing 2 and having as its other arm a manual actuatable handle 132. With this construction it simply is a matter of pulling down on the handle 132 to untension the belt by disengaging the roller 127 from it. Conversely, when the handle is pushed up to its normal position with the other arm 130 of its bellcrank 131 bearing against the confronting side 76 of the housing 2, the belt is tensioned by the pressure of the roller 127. This tension is readily predetermined by adjustment of the turnbuckle or other adjustable linkage 129, so that the belt normally will drivably connect the motor 103 and the shaft 106 but will slip on any malfunctioning of the machine.

Aside from protecting the fruit from contamination during treatment by facilitating enclosure of the drive mechanism for the several operating parts either in the housing 2 or in associated covers attached to the housing, the mounting of the several operating parts in part or entirely on the rigid housing renders it simple initially to establish or obtain the precise relative positions or relationships of the several operating parts and to maintain these relationships with a minimum of checking and attendant interruption of the machine. The journaling of the spindle 88 of the turret 4 in the housing 2 has the further advantage that by bolting or otherwise removably attaching the upright 49 to the inclined upper face 101 of the bedplate 1, the bushing 89, on detachment of the upright, can be slid off the rear end of the spindle and, without disturbing either the spindle or the turret, the upright and the crown cut stop 46, crown cut knife 50, mounting plate 51, and sealing plate 54, all of which are mounted on the upright, can readily be removed as a subassembly for cleaning or repairing.

Conventionally, a Ginaca machine is provided with shell and end eradicators to remove the usable fruit from the shells and ends of a pineapple as the latter are cut off by the sizing and crown and butt cut knives. In conformance with this practice, the illustrated machine is provided with a shell eradicator 133 and an end eradicator 134 mounted, respectively, on the housing 2 below the sizing knife 3 and on the stand 1 below and to a side of the turret 4. The illustrated eradicators are conventional except for their drives, the shell eradicator 133 receiving the shells as they are cut off by the sizing knife 5 and the end eradicator receiving the crown and butt ends as they are cut off by the crown and butt cut knives 50 and 55. In the usual manner both eradicators are adapted to press the fruit sides of the cut portions against the usual splitters and knives to cut out the usable fruit, the latter from the shells ordinarily being suitable for the chunk or crushed pack and from the ends for the juice pack. Rather than drive them independently of the other operating parts, the illustrated machine uses the take-off shaft 122 for both eradicators to be driven by the motor 103. This is accomplished by drivably connecting the take-off shaft 122 by a chain drive 135 to a shaft 136 extending longitudinally through and journaled in the housing 2 and driving at its front end the slatted conveyor 137 of the shell eradicator. The shaft 136 in turn is drivably connected to a second chain drive 138 for driving the drum 139 of the end eradicator through reduction gearing 140, both chain drives being enclosed in a common cover 141 mounted on the housing 2.

From the above detailed description it will be apparent that there has been provided an improved machine for sizing, trimming, and coring pineapples and like fruit, which is relatively simple and rugged in construction, treats fruit without damage or contamination, simplifies adjustment of the several interrelated parts and in operation is positive and efficient and capable of a rate heretofore unobtainable. It should be understood that the described and disclosed embodiment is merely exemplary of the invention and that all modifications are intended to be included which do not depart from either the spirit of the invention or the scope of the appended claims.

Having described my invention, I claim:

1. A machine for treating pineapples and the like comprising a rotary sizing knife, a multi-barreled indexable turret, a transfer passage from said knife to said turret, an endless feed conveyor having a plurality of spaced pushers each for pushing a pineapple through said knife, and means for increasing the speed of each of said pushers relative to said conveyor as a pineapple is pushed thereby through said knife and into said transfer passage.

2. A machine for treating pineapples and the like comprising a rotary sizing knife, a multi-barreled indexable turret, a transfer passage from said knife to said turret, an endless feed conveyor having a plurality of spaced pushers each for pushing a pineapple through said knife, and camming means for increasing the speed of each of said pushers relative to said conveyor as a pineapple is pushed thereby through said knife and into said transfer passage.

3. A machine for treating pineapples and the like comprising means for operating on pineapples and means for feeding pineapples to said operating means, said feeding means including endless drive means, pusher means drivably connected to and spaced along said drive means, and means acting on each of said pusher means adjacent an end of its advance flight for increasing the speed thereof relative to said drive means and the kinetic energy of a pineapple pushed thereby at the point of their disengagement.

4. A machine for treating pineapples and the like comprising means for operating on pineapples, and means for feeding pineapples to said operating means, said feeding means including endless drive means, pusher means drivably connected to and spaced along said drive means, and means acting on each of said pusher means adjacent an end of its advance flight for initially retarding and then increasing the speed thereof relative to said drive means and the kinetic energy of a pineapple pushed thereby at the point of their disengagement.

5. A machine for treating pineapples and the like comprising means for operating on pineapples, and means for feeding pineapples to said operating means, said feeding means including endless drive means riding adjacent said operating means over roller means, pusher means drivably connected to and spaced along said drive means, and camming means acting on each of said pusher means adjacent an end of its advance flight and cooperating with said roller means for temporarily increasing the speed of said pusher means relative to said drive means and the kinetic energy of a pineapple pushed thereby at the point of their disengagement.

6. A machine for treating pineapples and the like comprising a rotary sizing knife, an endless feed conveyor riding adjacent said knife over a roller and having a plurality of spaced pushers for feeding pineapples to and through said knife, and camming means connected to said conveyor and coacting with said roller on each of said pushers for independently accelerating the speed thereof relative to said conveyor as it pushes fruit through said sizing knife.

7. A machine for treating pineapples and the like comprising a sizing knife rotatable about an axis inclined rearwardly and downwardly at an angle of about 35–45°, a turret disposed rearwardly and rotatable about an axis parallel to the axis of said knife, a transfer passage aligned axially with said knife for transferring sized pineapples from said knife to said turret, and a feed conveyor disposed forwardly of said sizing knife, said feed conveyor including an endless drive, a plurality of pushers connected to and spaced along said drive for pushing pineapples through said knife into said passage, and means for individually accelerating each pusher as it pushes a pineapple into said transfer passage, said conveyor having a rear end portion inclined in correspondence with said knife axis.

8. A machine for treating pineapples and the like comprising a sizing knife rotatable about an axis inclined rearwardly and downwardly at an angle of about 35–45°, a turret disposed rearwardly and rotatable about an axis parallel to the axis of said knife, a transfer passage aligned axially with said knife for transferring sized pineapples from said knife to said turret, and a feed conveyor including an endless drive, a plurality of pushers connected to and spaced along said drive for pushing pineapples through said knife into said passage, and camming means for individually accelerating each pusher as it pushes a pineapple into said transfer passage, said conveyor having a rear end portion inclined in correspondence with said knife axis.

9. A machine for treating pineapples and the like comprising a sizing knife rotatable about an axis inclined rearwardly and downwardly at an angle of about 37°, a turret disposed rearwardly and rotatable about an axis parallel to the axis of said knife, a transfer passage aligned axially with said knife for transferring sized pineapples from said knife to said turret, and a feed conveyor including an endless drive, a plurality of pushers connected to and spaced along said drive for pushing pineapples through said knife into said passage, and camming means for individually accelerating each pusher as it pushes a pineapple into said transfer passage, said conveyor having a rear end portion inclined in correspondence with said knife axis.

10. A machine for treating pineapples and the like comprising a rotary sizing knife rotatable about an obliquely inclined axis, a multi-barreled indexable turret disposed rearwardly and rotatable about an axis parallel to the axis of said knife, a housing upstanding between said knife and turret, said knife and turret being removably mounted on and accessible, respectively, from a front and rear of said housing, a transfer passage extending through said housing axially aligned with said knife for transferring pineapples therefrom to barrels of said turret, operating means associated with said turret for cutting off ends of and coring pineapples therein and discharging pineapples therefrom, certain of said operating means being removably mounted on said housing, a feed conveyor for feeding pineapples through said knife into said passage, a drive motor on said housing and housed driving connections between said motor and said conveyor, knife, turret, and operating means.

11. A machine for treating pineapples and the like comprising a rotary sizing knife rotatable about an obliquely inclined axis, a multi-barreled indexable turret disposed rearwardly and rotatable about an axis parallel to the axis of said knife, a housing upstanding between said knife and turret, said knife and turret being removably mounted on and accessible, respectively, from a front and rear of said housing, a transfer passage extending through said housing rigid and axially aligned with said knife for transferring pineapples therefrom to barrels of said turret, operating means associated with said turret for cutting off ends of and coring pineapples therein and discharging pineapples therefrom, certain of said operating means being removably mounted on said housing, a feed conveyor for feeding pineapples through said knife into said passage, a drive motor on said housing, and housed driving connection means between said motor and said conveyor, knife, turret, and operating means.

12. A machine for treating pineapples and the like comprising a rotary sizing knife rotatable about an obliquely inclined axis, a multi-barreled indexable turret spaced rearwardly and rotatable about an axis parallel to the axis of said knife, a housing upstanding between and mounting said knife and turret, a barrel rigid and axially aligned with said knife, said barrel extending from said knife through said housing and opening rearwardly onto said turret, means including a cam and roller gear for indexing said turret and sequentially aligning each of said turret barrels with said first-named barrel, a slide mounted on and reciprocable relative to said housing parallel to said knife axis, a coring tube and a discharge plunger carried by said slide and each aligning with a presented turret barrel at a different stop of said turret, and means fixed to a shaft of said indexing cam for reciprocating said slide and thereby advancing and retreating said coring tube and discharge plunger relative to turret barrels presented thereto.

13. A machine for treating pineapples and the like comprising a rotary sizing knife rotatable about an obliquely inclined axis, a multi-barreled indexable turret spaced rearwardly and rotatable about an axis parallel to the axis of said knife, a housing upstanding between and mounting said knife and turret, a barrel rigid and axially aligned with said knife, said barrel extending from said knife through said housing and opening rearwardly onto said turret, means including a cam and roller gear for indexing said turret and sequentially aligning each of said turret barrels with said first-named barrel, a slide mounted on and reciprocable relative to said housing parallel to said knife axis, a coring tube and a discharge plunger carried by said slide and each aligning with a presented turret barrel at a different stop of said turret, means fixed to a shaft of said indexing cam for reciprocating said slide and thereby advancing and retracting said coring tube and discharge plunger relative to turret barrels presented thereto, and a motor mounted on said housing and drivably connected to the several operating parts of said machine for driving said parts.

14. A machine for treating pineapples and the like comprising a rotary sizing knife rotatable about an obliquely inclined axis, a multi-barreled indexable turret spaced rearwardly and rotatable about an axis parallel to the axis of said knife axis, a housing upstanding between and mounting said knife and turret, a barrel rigid and axially aligned with said knife, said barrel extending from said knife through said housing and opening rearwardly onto said turret, means including a cam and roller gear for indexing said turret and sequentially aligning each of said turret barrels with said first-named barrel, a slide mounted on and reciprocable relative to said housing parallel to said knife axis, a coring tube and a discharge plunger carried by said slide and each aligning with a presented turret barrel at a different stop of said turret, means fixed to a shaft of said indexing cam for reciprocating said slide and thereby advancing and retracting said coring tube and discharge plunger relative to turret barrels presented thereto, and a motor mounted on said housing and having covered driving connections to the several operating parts of said machine for driving said parts.

15. A machine for treating pineapples and the like comprising a rotary sizing knife rotatable about an inclined axis, a multi-barreled indexable turret disposed rearwardly and rotatable about an axis parallel to the axis of said knife, a housing upstanding between and mounting said knife and turret, an enclosed transfer passage axially aligned with said knife and extending rearwardly therefrom through said housing to and aligned in a stop of said turret with a barrel thereof, a plurality of operating devices associated with said turret for cutting off ends of and coring pineapples in and discharging pineapples from barrels of said turret, and means mounting certain of said devices and removable therewith as a subassembly from said machine.

16. A machine for treating pineapples and the like comprising a rotary sizing knife rotatable about an inclined axis, a multi-barreled indexable turret disposed rearwardly and rotatable about an axis parallel to the axis of said knife, a housing upstanding between and mounting said knife and turret, an enclosed transfer passage axially aligned with said knife and extending rearwardly therefrom through said housing to and aligned in a stop of said turret with a barrel thereof, a slide mounted on and reciprocable relative to said housing parallel to said knife axis, a coring tube and a discharge plunger mounted in transversely spaced relation on said slide and each advanceable and retractable on reciprocation thereof relative to a turret barrel in a stop position of said turret, and crank and lever means mounted on said housing for reciprocating said slide and effecting a slow advance and quick retraction of said coring tube relative to said presented barrel.

17. A machine for treating pineapples and the like comprising a rotary sizing knife rotatable about an inclined axis, a multi-barreled indexable turret disposed rearwardly and rotatable about an axis parallel to said axis of said knife, a housing upstanding between said knife and turret, said knife and turret being removably mounted on and accessible, respectively, from a front and rear of said housing, an enclosed transfer passage axially aligned with and extending rearwardly from said knife through said housing to said turret, said transfer passage aligning with a barrel of said turret in the first stop in the operating cycle thereof, stop means spaced rearwardly of and adjustable axially relative to said barrel for engaging and permitting limited projection from said barrel of a crown end of a pineapple entering thereinto from said transfer passage, and crown cut knife means associated with said stop means for cutting off said crown ends on subsequent indexing of said turret.

18. A machine for treating pineapples and the like comprising a rotary sizing knife rotatable about an inclined axis, a multi-barreled indexable turret disposed rearwardly and rotatable about an axis parallel to the axis of said knife, a housing upstanding between and mounting said knife and turret, an enclosed transfer passage aligned with and extending rearwardly from said knife through said housing for transferring a sized pineapple to a presented barrel of said turret, a feed conveyor having an elevated front portion and a rear portion inclined downwardly toward said knife for feeding pineapples through said knife into said transfer passage, a plurality of operating devices associated with said turret for trimming and coring pineapples therein and discharging pineapples therefrom, elevating means synchronized in drive with said feed conveyor for loading pineapples thereonto from a lower lever, and motor means mounted on said housing for driving said knife, turret, operating devices, feed conveyor and elevating means.

19. A machine for treating pineapples and the like comprising a rotary sizing knife rotatable about an inclined axis, a multi-barreled indexable turret disposed rearwardly and rotatable about an axis parallel to the axis of said knife, a housing upstanding between and mounting said knife and turret, an enclosed transfer passage aligned with and extending rearwardly from said knife through said housing for transferring a sized pineapple to a presented barrel of said turret, a feed conveyor having an elevated front portion and a rear portion inclined downwardly toward said knife for feeding pineapples through said knife into said transfer passage, a plurality of operating devices associated with said turret for trimming and coring pineapples therein and discharging pineapples therefrom, a plurality of elevators mounted at opposite sides of and synchronized in drive with said feed conveyor for loading pineapples thereonto from a lower lever, and knife, turret, operating devices and feed conveyor.

References Cited by the Examiner
UNITED STATES PATENTS

| | | | |
|---|---|---|---|
| 736,385 | 8/1903 | Hamilton | 198—171 X |
| 1,060,250 | 4/1913 | Ginaca | 146—6 |
| 1,112,130 | 9/1914 | Ginaca | 146—6 |
| 1,116,406 | 11/1914 | Fleischer | 198—110 X |
| 1,430,069 | 9/1922 | Fisher | 146—6 |
| 2,029,344 | 2/1936 | Sheldon | 130—9.1 |
| 2,195,193 | 3/1940 | Stanley | 146—6 |
| 2,652,915 | 9/1953 | Fox | 146—6 X |
| 2,676,696 | 4/1954 | Gerhartz | 198—170 |
| 2,765,829 | 10/1956 | De Back et al. | 146—6 |
| 2,887,212 | 5/1959 | Waite | 198—170 |

ROBERT C. RIORDON, *Primary Examiner.*

C. W. ROBINSON, J. SPENCER OVERHOLSER,
*Examiners.*

W. G. ABERCROMBIE, *Assistant Examiner.*